(12) United States Patent
Tanaka et al.

(10) Patent No.: US 7,192,162 B2
(45) Date of Patent: Mar. 20, 2007

(54) SPOTLIGHT

(75) Inventors: Tsunemichi Tanaka, Tokyo (JP); Tsutomu Ishizone, Tokyo (JP)

(73) Assignee: Marumo Electric Co., Ltd., Tokyo (JP)

( * ) Notice: Subject to any disclaimer, the term of this patent is extended or adjusted under 35 U.S.C. 154(b) by 205 days.

(21) Appl. No.: 10/524,058

(22) PCT Filed: Sep. 8, 2003

(86) PCT No.: PCT/JP03/11415

§ 371 (c)(1), (2), (4) Date: Feb. 8, 2005

(87) PCT Pub. No.: WO2004/023031

PCT Pub. Date: Mar. 18, 2004

(65) Prior Publication Data

US 2005/0286250 A1    Dec. 29, 2005

(30) Foreign Application Priority Data

Sep. 9, 2002 (JP) .............................. 2002-262832

(51) Int. Cl.
*F21V 29/00* (2006.01)
(52) U.S. Cl. ...................... 362/268; 362/277; 362/319; 362/280; 362/281
(58) Field of Classification Search ................ 362/268, 362/319, 277, 280, 281, 311
See application file for complete search history.

(56) References Cited

U.S. PATENT DOCUMENTS

| 3,088,370 | A | * | 5/1963 | Otto et al. ................... 359/823 |
| 4,151,584 | A | * | 4/1979 | Labrum ....................... 362/302 |
| 4,519,020 | A | * | 5/1985 | Little .......................... 362/268 |
| 6,092,914 | A | * | 7/2000 | Esakoff et al. .............. 362/268 |
| 6,837,596 | B2 | * | 1/2005 | Tanaka et al. .............. 362/277 |

FOREIGN PATENT DOCUMENTS

| JP | 3271709 | 12/1991 |
| WO | 1293722 | 3/2003 |

* cited by examiner

*Primary Examiner*—Sandra O'Shea
*Assistant Examiner*—Jacob Y. Choi
(74) *Attorney, Agent, or Firm*—Dykema Gossett PLLC

(57) ABSTRACT

A novel spotlight where the position of image formation does not change even when the zoom adjustment is made after focus adjustment, so that focus adjustment and zoom adjustment can be facilitated. When a drive shaft (10) is rotated by operating a zoom adjustment handle (5), a lens (4a) moves forward and backward according to an unequal pitch (P1) of a first screw section (15), and a lens (4b) moves forward and backward according to an equal pitch (P2) of a second screw section (16), so that the distances between the lenses (4a–4c) are changed and zoom adjustment is made. Focusing adjusted by a focus adjustment mechanism (b) does not change even when the distances between the lenses are changed. Therefore, focus adjustment and zoom adjustment can be made extremely simply, and the spotlight can be used particularly useful in performance space such as TV studios and theater stages.

5 Claims, 8 Drawing Sheets

(iii)

(III)

FIG. 8

SPOTLIGHT

TECHNICAL FIELD

The present invention relates to the improvement of a spotlight used in performance space, such as TV studios and theater stages, and more particularly, to a spotlight in which a light source, a reflector and at least two lenses are arranged in a lamp body, and which comprises a focus adjustment function for adjusting the distance between each of the lenses and the light source to adjust the focus of a transmitted light (the position of image formation) and a zoom adjustment function for adjusting the distances between the lenses to adjust the size of the projected image (the spread angle of the transmitted light).

BACKGROUND ART

As a mechanism for performing a focus adjustment or a zoom adjustment in such a spotlight, there is a mechanism which a first lens and a second lens provided in a lens barrel of the lamp body are supported along the optical axis by a first lens holder and a second lens holder so as to be slid forward and backward, respectively, a first adjustment handle and a second adjustment handle each corresponding to the lens holder are arranged at the outside of the lens barrel so as to be slid forward and backward, each of the adjustment handles is slid to separately adjust the position of each lens so that the distance between the lenses is adjusted to adjust the size of the projected image (zoom adjustment) and the distance between the light source and each of the lenses is adjusted to perform the focus adjustment of the transmitted light (for example, see Japanese unexamined Utility Model Publication No. 62-89708).

However, performing the zoom adjustment and the focus adjustment by separately sliding each lens by the operation of the adjustment handle provided in each lens needs experience and intuition for the handle operation. Accordingly, there is a problem in that, if a user is not an expert, it is difficult to perform the above-mentioned adjustments and the operations thereof must be repeatedly performed.

In order to solve the above-mentioned problem, a technique for adjusting the distance between two lenses by rotating one handle to adjust the size of the projected image, and adjusting the distance between the light source and each of the lenses by sliding the handle to perform the focus adjustment of the transmitted light has been suggested (for example, see U.S. Pat. No. 6,092,914).

DISCLOSURE OF THE INVENTION

By performing the zoom adjustment and the focus adjustment by rotating one handle, the rack which is integrally slid with the lens holder mounted with each lens is engaged with the gear which is integrally rotated with the handle, and each lens holder is integrally slid with the rack by the rotation of the gear performed by rotating the handle, so that the lenses are separated from or closed to each other to perform the zoom adjustment. Also, by sliding the handle, each lens holder is integrally slid with the rack while the distance between the lenses is maintained, so that the focus adjustment is made.

Therefore, according to such a structure, since the screw pitches of the gear and the rack engaged with the gear are the same as each other and the distance between the lenses generated by rotating the handle is determined by the screw pitch, it is difficult to associate the position of each lens of which the focusing is adjusted with the position of the lens of which the zoom is adjusted. Accordingly, in the case in which the zoom adjustment is made after the focus adjustment is made, the position of the image formation is changed. Thereby, the focusing should be adjusted again and thus the operability thereof is poor.

The present invention is made in consideration of the above-mentioned problems, and it is an object of the present invention to provide a novel spotlight capable of simply performing the focus adjustment and the zoom adjustment without changing the position of the image formation although the zoom adjustment is made after the focus adjustment is made, in the spotlight for performing the focus adjustment and the zoom adjustment by sliding at least two lenses which are arranged in the lamp body forward and backward along the optical axis.

In order to solve the above-mentioned problems, the present invention provides a spotlight in which a light source, a reflector and at least two first and second lenses are arranged in predetermined positions in a lamp body, and a zoom adjustment mechanism for adjusting the distances between the lenses to adjust the size of the projected image and a focus adjustment mechanism for adjusting the distance between the light source and each of the lenses to perform the focus adjustment of the transmitted light are included, wherein the zoom adjustment mechanism comprises a drive shaft which is arranged parallel to an optical axis and is rotated forward or backward by rotating a zoom adjustment handle, a first lens holder on which the first lens is mounted and which is screw-coupled to a first screw section of the drive shaft to move forward or backward by the rotation of the drive shaft, and a second lens holder on which the second lens is mounted and which is screw-coupled to a second screw section of the drive shaft to move forward or backward by the rotation of the drive shaft, wherein the focus adjustment mechanism comprises a base which is supported so as to be slid forward and backward along the optical axis and a focus adjustment handle for sliding the base forward and backward, and wherein the drive shaft and the first and second lens holders are mounted on a base, and the first and second screw sections formed in the drive shaft are formed with predetermined pitches, respectively, such that each of the lenses is positioned at a predetermined position at which the focusing adjusted by the focus adjustment mechanism does not change even when the distances between the lenses are changed by the zoom adjustment mechanism.

By this structure, the position of image formation which is adjusted once is not changed even when the size of the projected image is adjusted to a desired size by operating the zoom adjustment handle to change the distances between the lenses after the focusing of the transmitted light is adjusted by operating the focus adjustment handle to slide the base forward and backward.

According to the aspect to the present invention, the first screw section is the forward transfer screw formed in the drive shaft and the second screw section is the backward transfer screw formed in the drive shaft, in accordance with the forward rotation of the drive shaft, the first lens holder moves forward according to the pitch of the first screw section and the second lens holder moves backward according to the pitch of the second screw section, so that the distances between the lenses are changed, and, in accordance with the backward rotation of the drive shaft, the first lens holder moves backward according to the pitch of the first screw section and the second lens holder moves forward according to the pitch of the second screw section, so that the distances between the lenses are changed.

According to the aspect of the present invention, the first and second screw sections are the forward transfer screws formed in the drive shaft, in accordance with the forward rotation of the drive shaft, the first lens holder moves forward according to the pitch of the first screw section and the second lens holder moves forward according to the pitch of the second screw section, so that the distances between the lenses are changed, and, in accordance with the backward rotation of the drive shaft, the first lens holder moves backward according to the pitch of the first screw section and the second lens holder moves backward according to the pitch of the second screw section, so that the distances between the lenses are changed.

According to the aspect of the present invention, the spotlight further comprises a third lens fixedly mounted on the base.

According to the aspect of the present invention, the focus adjustment mechanism comprises a rack formed in the lamp body along the sliding direction of the base, a gear which integrally moves forward and backward with the base while being rotated in engagement with the rack, and a focus adjustment handle which is arranged at the outside of the ramp body and which moves forward and backward while being integrally rotated with the gear, the gear is rotated by the rotation operation of the focus adjustment handle and the base is formed so as to move forward and backward according to the pitch of the screw section formed in the rack.

REFERENCE NUMERALS 4a lens
4b lens
5 zoom
10 drive shaft
15 first screw section
16 second screw section

BEST MODE FOR CARRYING OUT THE INVENTION

Figure 1:
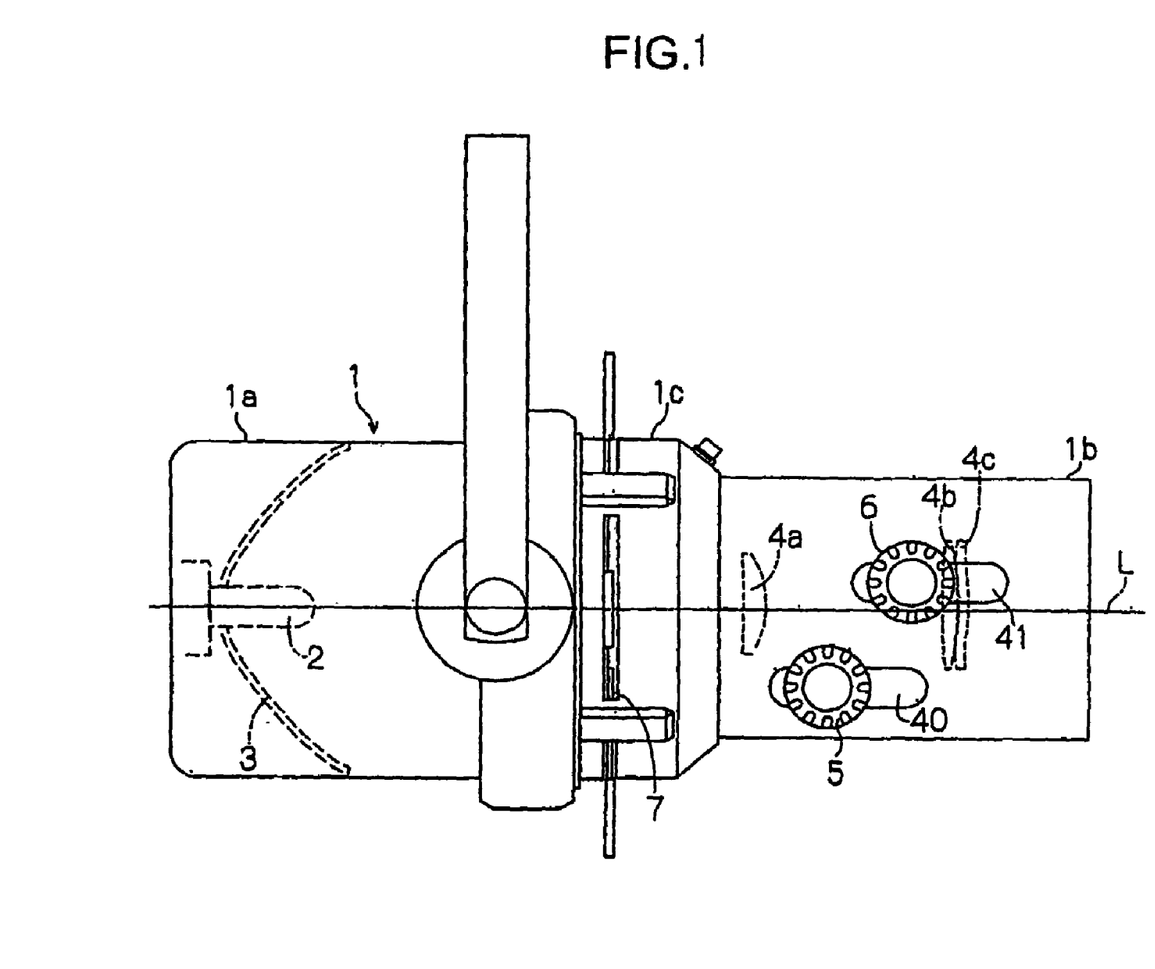
FIG. 1 is a front view showing an embodiment of a spotlight according to the present invention.

Hereinafter, an embodiment of a spotlight according to the present invention will be described with reference to FIGS. 1 to 6. FIG. 1 is a side view showing a schematic structure of the spotlight A of the present embodiment. In FIG. 1, 1 is a lamp body, 2 is a light source, 3 is a reflector, 4a, 4b, and 4c are lenses, 5 is a zoom adjustment handle, 6 is a focus adjustment handle, and L is an optical axis.

In the lamp body 1, a cutter frame 1c accommodating a needed numbers of cutter blades 7 for cutting the light passing through an aperture in an any frame shape is arranged between a lamp housing section 1a accommodating the light source 2 and the reflector 3 and the lens barrel section 1b accommodating the lenses 4a, 4b and 4c. In the lens barrel section 1b, a zoom adjustment mechanism a for adjusting the distance between the lens 4a, the lens 4b and the lens 4c to adjust the size of the projected image and a focus adjustment mechanism b for adjusting the distance between the light source 1 and each of the lenses 4a, 4b and 4c to perform the focus adjustment of the transmitted light are provided.

Figure 2:
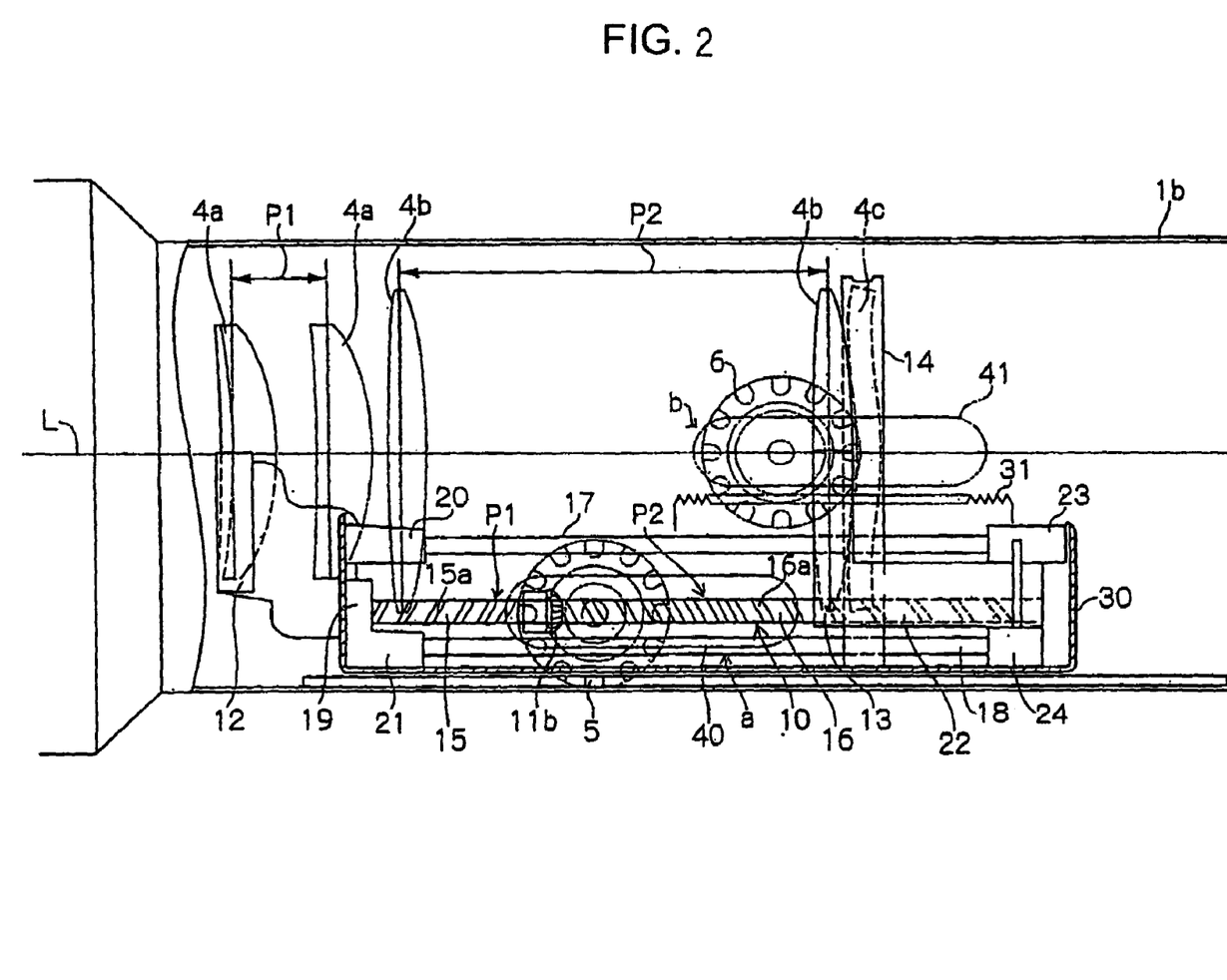
FIG. 2 is an enlarged cross-sectional view of a main part of FIG. 1 and shows the zoom adjustment state.
Figure 3:
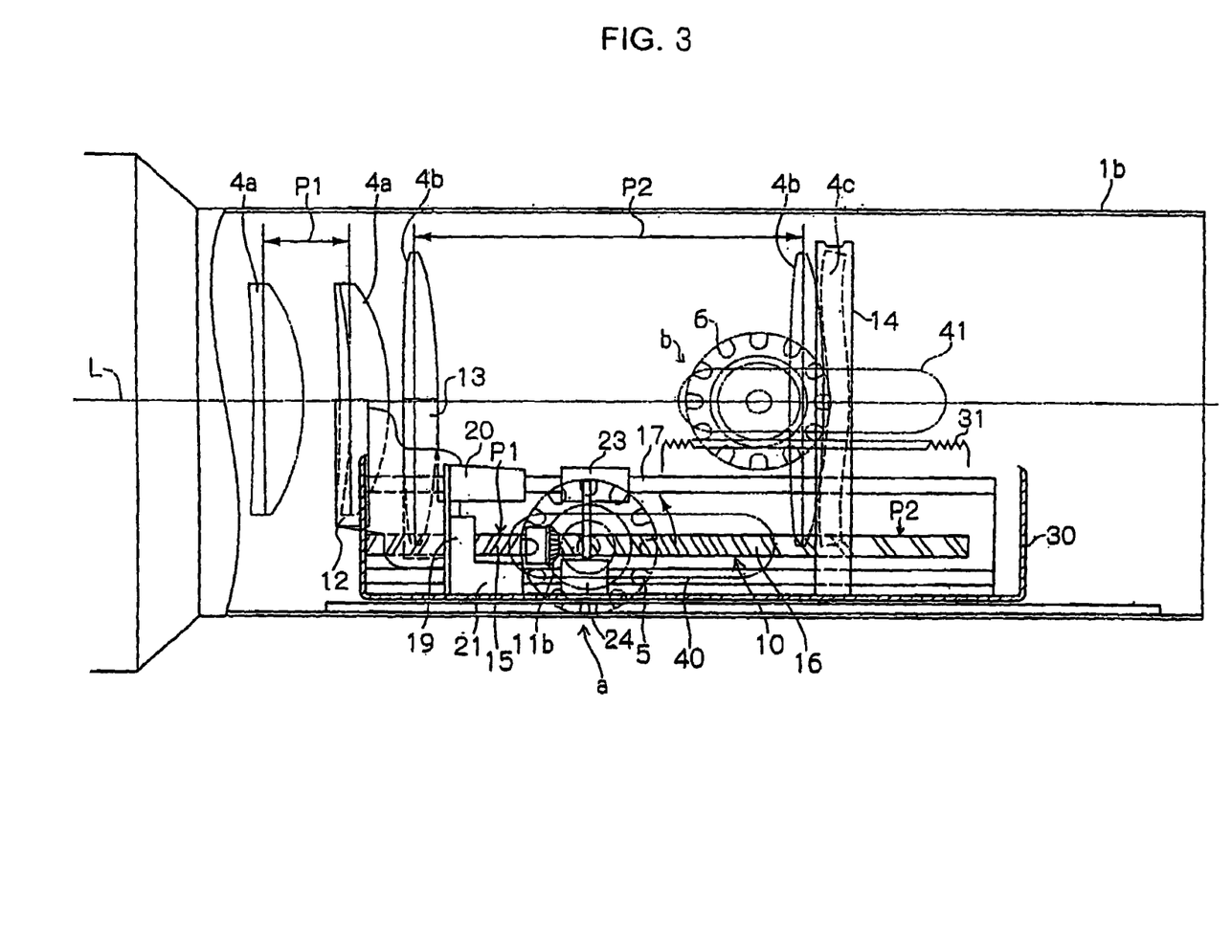
FIG. 3 is an enlarged cross-sectional view of a main part of FIG. 1 and shows the zoom adjustment state.
Figure 5:
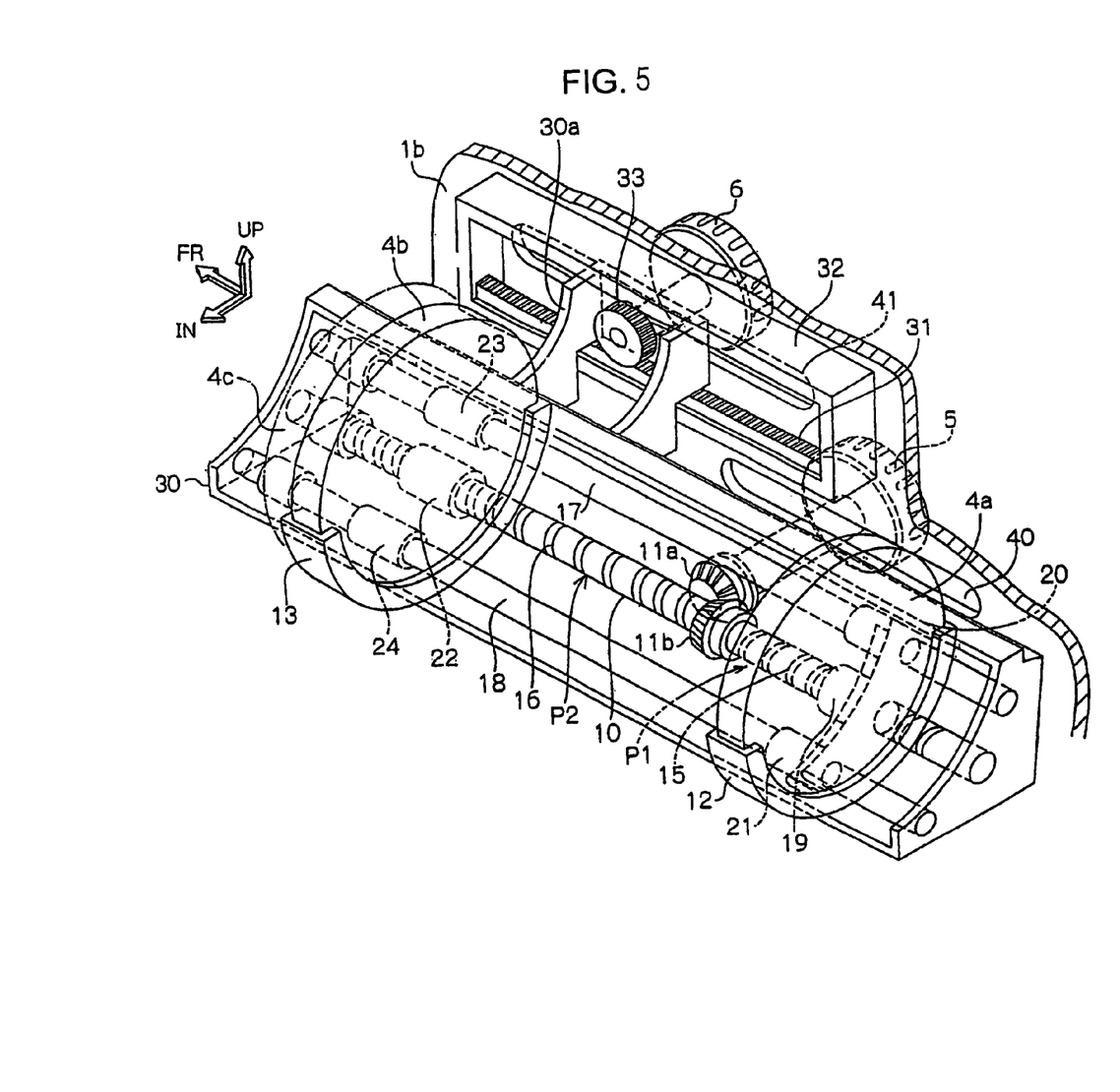
FIG. 5 is an enlarged cross-sectional view of a main part showing a focus adjustment mechanism and a zoom adjustment mechanism.

As shown in FIGS. 2, 3 and 5, the zoom adjustment mechanism a changes the distances between three lenses 4a, 4b and 4c to adjust the size of the projected image (the spread angle of the transmitted light), if necessary. The zoom adjustment mechanism a comprises a zoom adjustment handle 5 arranged at the outside of the lens barrel section 1b, a drive shaft 10 which is constructed parallel to the optical axis L and is rotated forward and backward by the rotation operation of the zoom adjustment handle 5, bevel gears 11a, 11b which rotate the drive shaft 10 forward and backward by the forward and backward rotation of the zoom adjustment handle 5, a lens holder 12 on which the lens 4a is mounted, a lens holder 13 on which the lens 4b is mounted, and a lens holder 14 on which the lens 4c is mounted.

The drive shaft 10 is constructed so as to be freely rotated between the front and rear ends of the below-mentioned base 30. The drive shaft 10 is rotated forward by the forward rotation operation of the zoom adjustment handle 5, and is rotated backward by the backward rotation operation thereof. On the part of the drive shaft 10 close to the light source 2, a ball screw (transfer screw) 15 forming a first screw section has the below-mentioned first pitch P1 and is formed as a right screw. Also, on the section of the drive shaft 10 close to the front end of the lamp body, a ball screw (transfer screw) 16 forming a second screw section has the below-mentioned pitch P2 and is formed as a left screw.

Between the front and rear ends of the base 30, upper and lower guide shafts 17 and 18 are constructed parallel to the drive shaft 10.

The lens holder 12 comprises a screw coupling section 19 accommodating the ball screw-coupled to the ball screw 15 forming the first screw section of the drive shaft 10, moves forward by the forward rotation of the drive shaft 10 and moves backward by the backward rotation thereof.

In addition, the lens holder 12 comprises guide sections 20 and 21 for guiding the forward and backward sliding of the lens holder 12 so that that the upper and lower guide shafts 17 and 18 are freely slid.

The lens holder 13 comprises a screw coupling section 22 accommodating the ball screw-coupled to the ball screw 16 forming the second screw section of the drive shaft 10, moves backward by the forward rotation of the drive shaft 10 and moves forward by the backward rotation thereof.

In addition, the lens holder 13 comprises guide sections 23 and 24 for guiding the forward and backward sliding of the lens holder 13 so that the upper and lower guide shafts 17 and 18 are freely slid.

The lens holder 14 is fixed on the base 30 and supports the lens 4c such that the lens 4c is fixed to the base 30.

Figure 4:
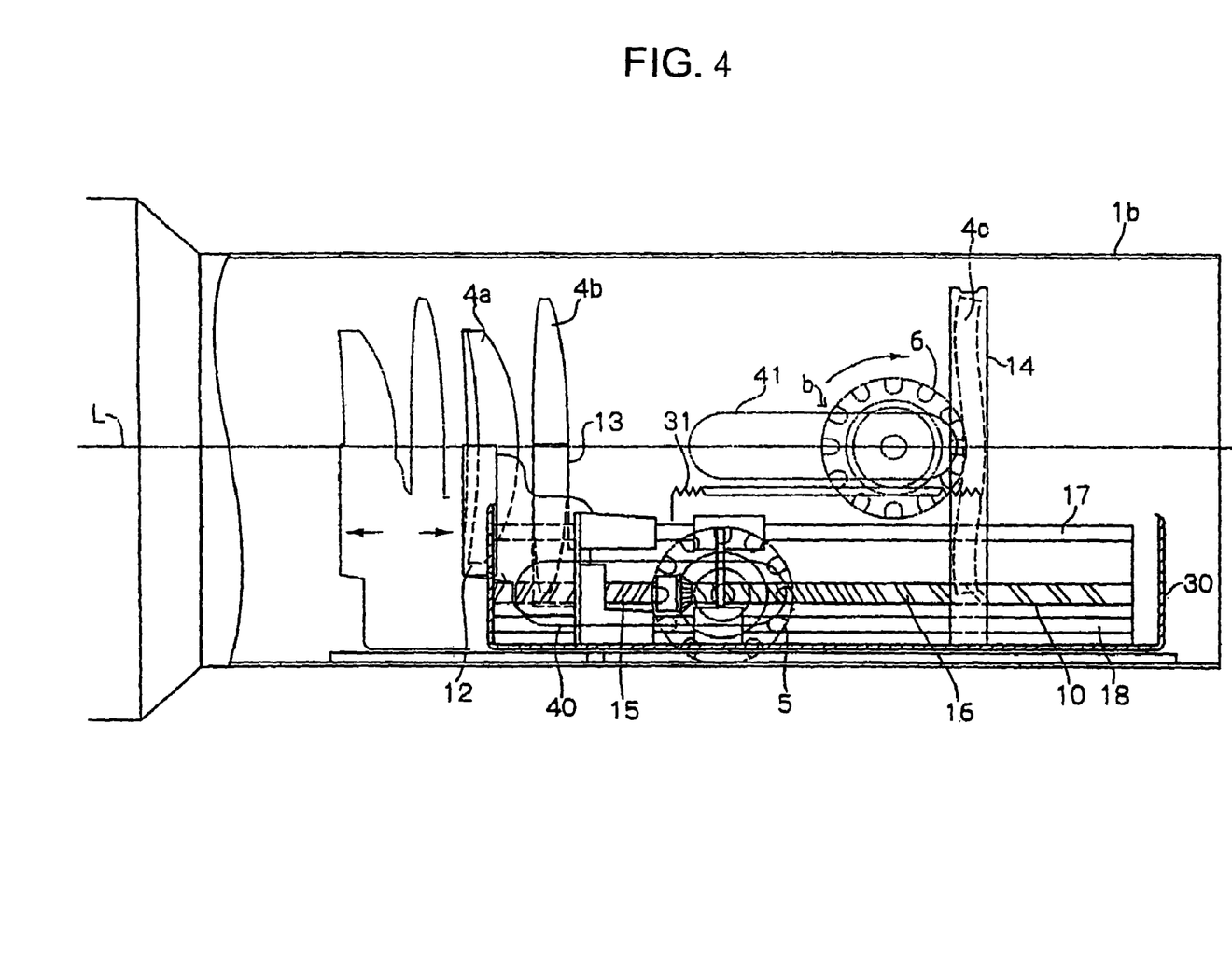
FIG. 4 is an enlarged cross-sectional view of a main part of FIG. 1 and shows the focus adjustment state.

As shown in FIGS. 4 and 5, the focus adjustment mechanism b is one for adjusting the distance between each of the lenses 4a, 4b and 4c and the light source 2 to perform the focus adjustment of the transmitted light, and comprises the base 30 which is supported so as to be freely slid forward and backward along the optical axis L, a rack 31 formed in the inner surface of the lens barrel section 1b along the sliding direction of the base 30, a guide rail 32 which is vertically provided parallel to the rack 31 and supports the guide section 30a protruding at the side of the base 30 such that the guide section 30a is freely slid forward and backward, a gear 33 which integrally moves forward and backward with the base 30 while being rotated in engagement with the rack 31, and a focus adjustment handle 6 which is arranged at the outside of the lens barrel section 1b and moves forward and backward while being integrally rotated with the gear 30.

On the base 30, the drive shaft 10, the guide shafts 17 and 18, the lens holders 12, 13 and 14, and the lenses 4a, 4b and 4c supported by the lens holders are mounted.

Further, in the drive shaft 10, the ball screw 15 forming the first screw section and the ball screw 16 forming the second screw section have the pitches P1 and P2, respectively, such that each of the lenses 4a, 4b and 4c is positioned at a predetermined position at which the focusing adjusted by the focus adjustment mechanism b does not change even when the distances between the lenses 4a, 4b and 4c are changed by the zoom adjustment mechanism a.

In other words, the ball screw 15 and the ball screw 16 have the predetermined pitches P1 and P2, respectively, such that each of the lenses 4a to 4c is positioned at a predetermined position at which the focusing does not change by the focus adjustment mechanism b even when the distances between the lenses 4a, 4b and 4c are changed, based on the various conditions, such as the lens characteristics of each of the lenses 4a to 4c and the adjustment range of the size of the projected image desired to be obtained.

For example, in the spotlight A of the present embodiment, the adjustment range in the size of the projected image desired to be obtained (zoom adjustment range) is 20 to 35 degrees. In the lens shape of each of the lenses 4a, 4b and 4c, when the pitch P2 of the transfer screw groove 16a of the ball screw 16 is set to about 17 mm, on the basis of the reference line set to the end of the drive shaft 10 at the side of the light source 2, the pitch P1 is not equal to the pitch P2 such that the dimension from the reference line and the center of each transfer screw groove 15a for each one rotation toward the front end side of the drive shaft 10 becomes 12 mm, 21 mm, 28 mm, 35 mm, 40 mm, 45 mm, 50 mm, 53 mm, and 57 mm. Thereby, even when the distances between the lenses 4a, 4b and 4c are changed by the zoom adjustment mechanism a, the focusing adjusted by the focus adjustment mechanism b is not changed.

The reference numerals 40 and 41 shown in FIGS. 1 to 5 show elongated holes formed in the lens barrel section 1b for guiding the sliding of the zoom adjustment handle 5 and the focus adjustment handle 6. These elongated holes 40 and 41 are closed such that the sliding of the zoom adjustment handle 5 and the focus adjustment handle 6 is not interrupted by a plurality of shield mechanisms having the known bellows structure in which a plurality of light shielding plates overlaps each other, preventing the light from being leaked.

In addition, in the present embodiment, in order to obtain the zoom adjustment range of 20 to 35 degrees, the aberration is suppressed and the distortion of the projected image is prevented by using three lenses 4a, 4b and 4c. However, in the case of obtaining the zoom adjustment range of 15 to 25 degrees, three lenses 4a', 4b' and 4c' shown in FIG. 7 are used, and, in the case of obtaining the zoom adjustment range of 30 to 50 degrees, three lenses 4a", 4b" and 4c" shown in FIG. 8 are used, thereby the aberration can be suppressed and the distortion of the projected image can be prevented.

Figure 6:
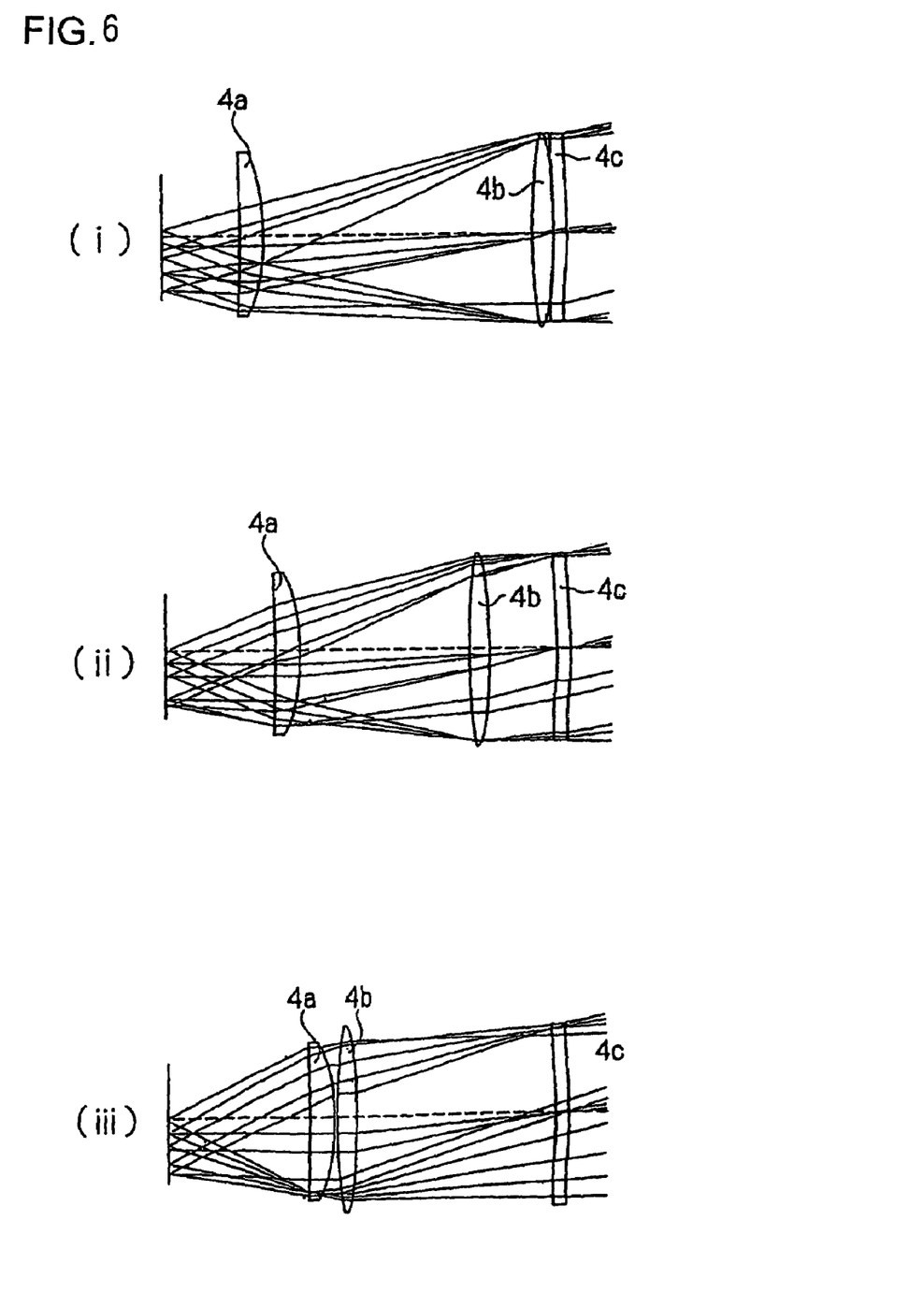
FIG. 6 is a schematic view showing an example of combining the lenses having zoom angles of 20 to 35 degrees.

Further, in FIG. 6, the sizes of the projected image (the spread angel of the transmitted light) are 20 degrees (i), 25 degrees (ii), and 35 degrees (iii). In FIG. 7, the sizes of the projected image are 15 degrees (i), 20 degrees (ii), and 25 degrees (iii). In FIG. 8, the sizes of the projected image are 30 degrees (i), 40 degrees (ii) and 50 degrees (iii).

Figure 7:
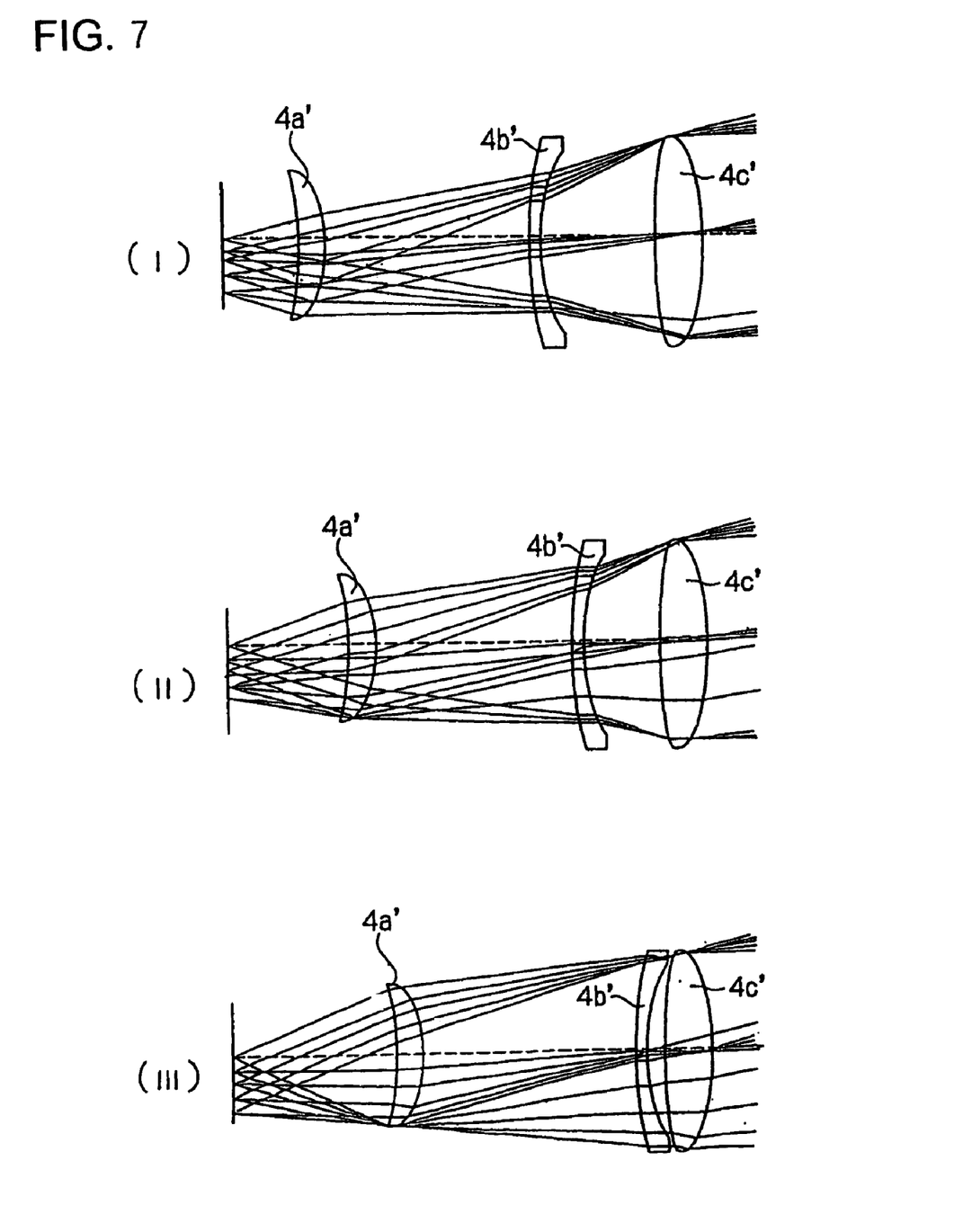
FIG. 7 is a schematic view showing an example of combining the lenses having zoom angles of 15 to 25 degrees.

In addition, in the present embodiment shown in FIG. 7, the first and second screw sections 15 and 16 shown in FIGS. 1 to 6 are composed of the forward transfer screws (right screw) formed in the drive shaft 10. The lens holder 12 supporting the lens 4a' moves forward according to the pitch of the first screw section 15 by the forward rotation of the drive shaft 10 and the lens holder 13 supporting the lens 4b' moves forward according to the pitch of the second screw section 16, so that each of the lenses 4a', 4b' and 4c' is separated from each other or closed to each other. The lens holder 12 moves backward according to the pitch of the first screw section 15 by the backward rotation of the drive shaft 10 and the lens holder 13 moves backward according to the pitch of the second screw section 16, so that each lens is separated from each other or closed to each other. Moreover, the first and second screw sections 15, 16 are formed with predetermined pitches, respectively, such that each of the lenses 4a' to 4c' is positioned at a predetermined position at which the focusing adjusted by the focus adjustment mechanism b does not change even when the distances between the lenses 4a', 4b' and 4c' are changed, based on the various conditions such as the lens characteristics of each of the lenses 4a', 4b' and 4c' and the size adjustment range of the projected image desired to be obtained.

Figure 8:
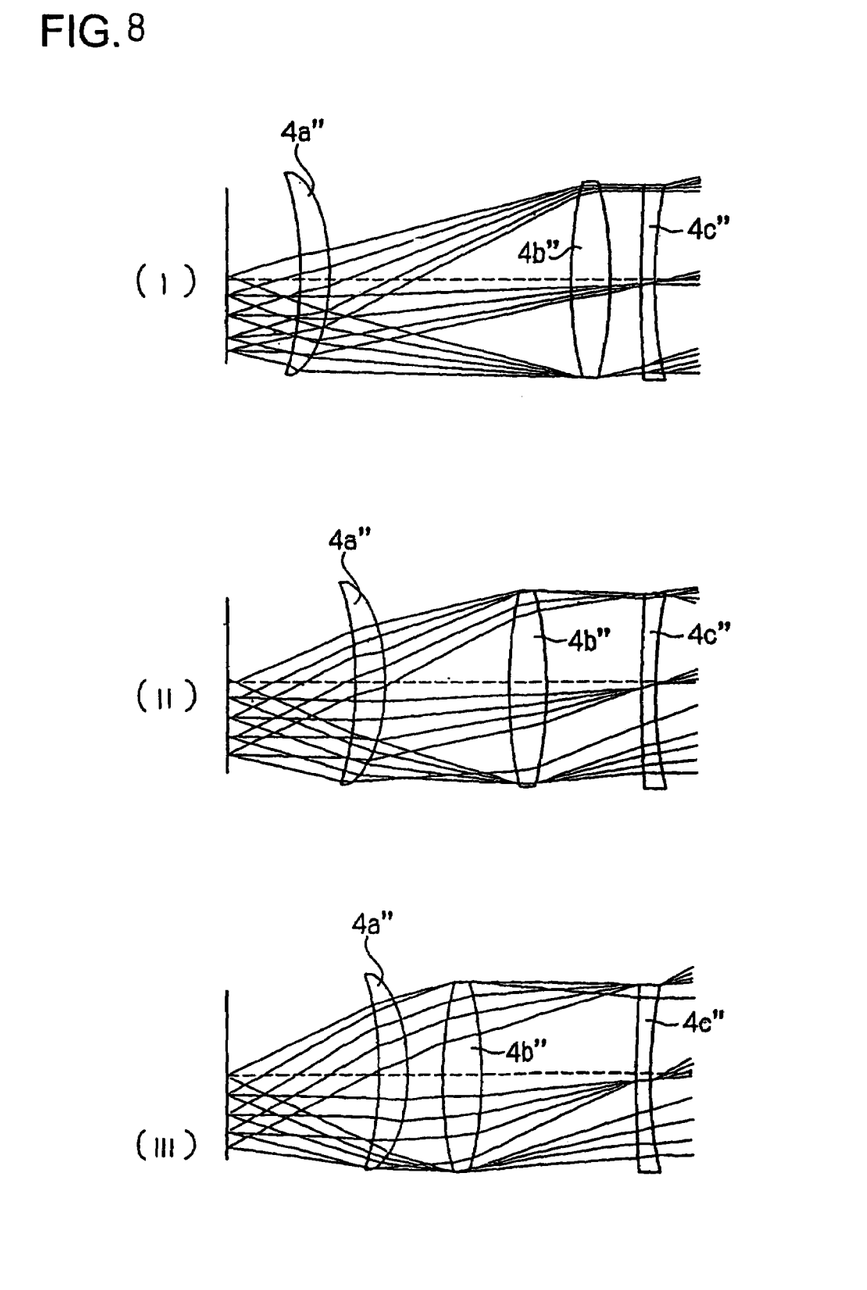
FIG. 8 is a schematic view showing an example of combining the lenses having zoom angles of 30 to 50 degrees.

In the embodiment shown in FIG. 8, similarly to the embodiment shown in FIGS. 1 to 6, the first and second screw sections 15 and 16 are composed of the forward transfer screw (the right screw) and the backward transfer screw (the left screw). In this embodiment, the first and second screw sections 15 and 16 are formed with predetermined pitches, such that each of the lenses 4a" to 4c" is positioned at the predetermined position at which the focusing adjusted by the focus adjustment mechanism b does not change even when the distances between the lenses 4a", 4b" and 4c" are changed, based on the various conditions, such as the lens characteristics of each of the lenses 4a", 4b" and 4c" and the size adjustment range of the projected image.

As such, decreasing the size adjustment range (the zoom ratio) of the projected image desired to be obtained efficiently suppresses the aberration and prevents the distortion of the projected image. Various kinds of the lens barrel sections are formed by combining the lenses each having a different zoom ratio and each lens barrel section is formed such that the lens barrel section can be attached and detached to the cutter frame, and thus the lens barrel section having an adequate zoom ratio is selected and used according to the usage object.

Although the embodiment of the spotlight according to the present invention is described with reference to the accompanying drawings, the present invention is not limited to the above-mentioned embodiment and various modifications thereof may be performed in the technical scope claimed in the claims.

INDUSTRIAL APPLICABILITY

According to the present invention, since the present invention is composed as mentioned above, the position of image formation of the transmitted light which is adjusted once is not changed even when the size of the projected image is adjusted to a desired size by operating the zoom adjustment handle after the focusing of the transmitted light is adjusted by operating the focus adjustment handle. Accordingly, the focus adjustment and the zoom adjustment can be made very simply, and the spotlight can be suitably used particularly in performing art stages, such as TV studios and the theater stages.

The invention claimed is:

1. A spotlight comprising a light source, a reflector and at least first and second lenses which are arranged in predetermined positions in a lamp body, a zoom adjustment mechanism for adjusting the distances between the lenses to adjust the size of the projected image, and a focus adjustment mechanism for adjusting the distance between the light source and each of the lenses to perform the focus adjustment of the transmitted light, wherein the zoom adjustment mechanism comprises a drive shaft which is arranged parallel to an optical axis and is rotated forward or backward by rotating a zoom adjustment handle, a first lens holder on which the first lens is mounted and which is screw-coupled to a first screw section of the drive shaft to move forward or backward by the rotation of the drive shaft, and a second lens holder on which the second lens is mounted and which is screw-coupled to a second screw section of the drive shaft to move forward or backward by the rotation of the drive shaft, the focus adjustment mechanism comprises a base which is supported so as to be slid forward and backward along the optical axis and a focus adjustment handle for sliding the base forward and backward, and the drive shaft and the first and second lens holders are mounted on a base, and the first and second screw sections formed in the drive shaft are formed with predetermined pitches, respectively, such that each of the lenses is positioned at a predetermined position at which the focusing adjusted by the focus adjustment mechanism does not change even when the distances between the lenses are changed by the zoom adjustment mechanism.

2. The spotlight according to claim 1, wherein the first screw section is the forward transfer screw formed in the drive shaft and the second screw section is the backward transfer screw formed in the drive shaft, in accordance with the forward rotation of the drive shaft, the first lens holder moves forward according to the pitch of the first screw section and the second lens holder moves backward according to the pitch of the second screw section, so that the distances between the lenses are changed, and in accordance with the backward rotation of the drive shaft, the first lens holder moves backward according to the pitch of the first screw section and the second lens holder moves forward according to the pitch of the second screw section, so that the distances between the lenses are changed.

3. The spotlight according to claim 1, wherein the first and second screw sections are the forward transfer screws formed in the drive shaft, in accordance with the forward rotation of the drive shaft, the first lens holder moves forward according to the pitch of the first screw section and the second lens holder moves forward according to the pitch of the second screw section, so that the distances between the lenses are changed, and in accordance with the backward rotation of the drive shaft, the first lens holder moves backward according to the pitch of the first screw section and the second lens holder moves backward according to the pitch of the second screw section, so that the distances between the lenses are changed.

4. The spotlight according to claim 1, further comprising a third lens fixedly mounted on the base.

5. The spotlight according to claim 1, wherein the focus adjustment mechanism comprises a rack formed in the lamp body along the sliding direction of the base, a gear which integrally moves forward and backward with the base while being rotated in engagement with the rack, and a focus adjustment handle which is arranged at the outside of the lamp body and which moves forward and backward while being integrally rotated with the gear, and the gear is rotated by the rotation operation of the focus adjustment handle and the base is formed so as to move forward and backward according to the pitch of the screw section formed in the rack.

* * * * *